March 31. 1925.
S. E. ALLEY
1,531,895
STEAM DRIVEN ROAD VEHICLE
Filed March 10, 1924
2 Sheets-Sheet 2
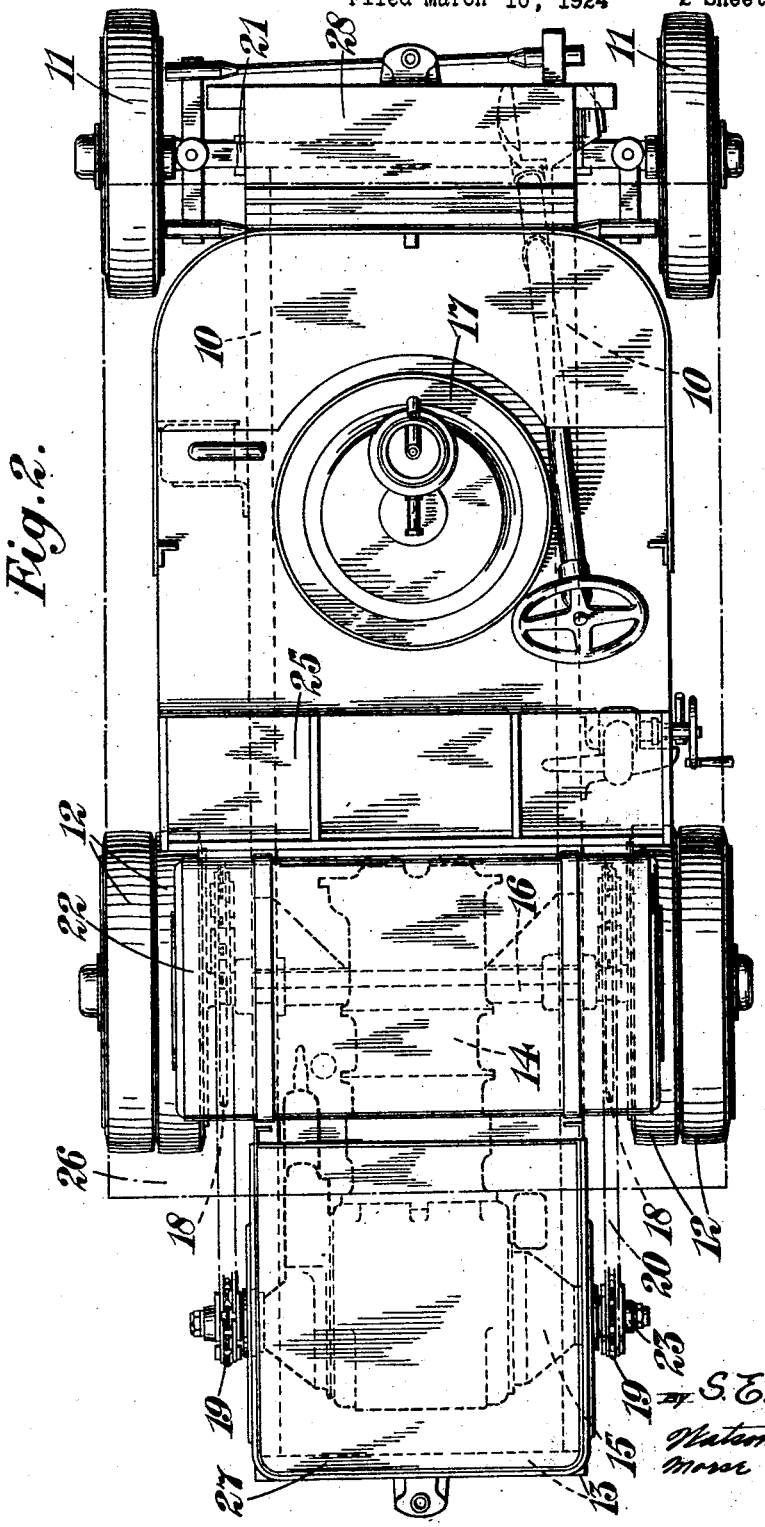

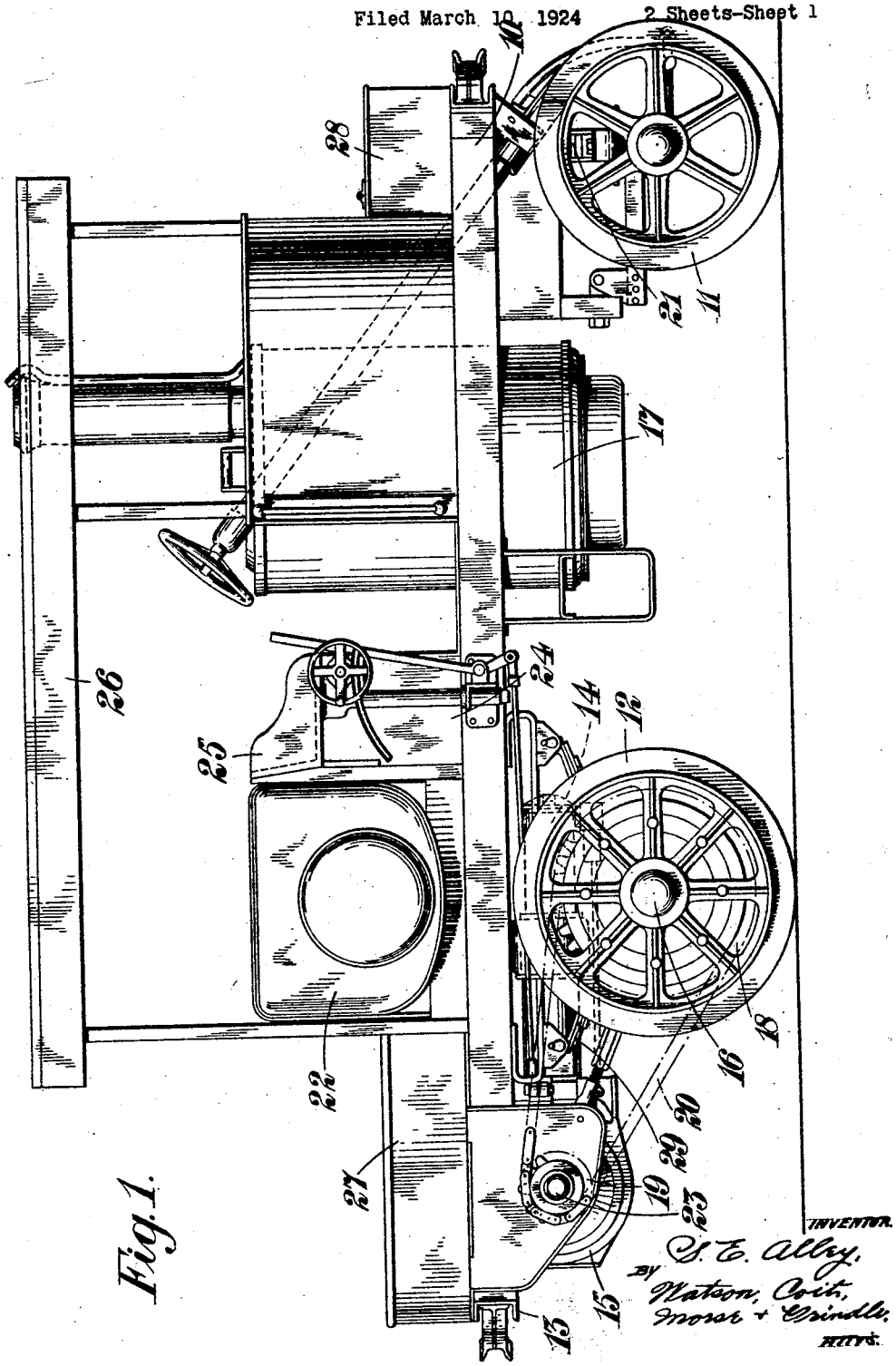

Patented Mar. 31, 1925.

1,531,895

UNITED STATES PATENT OFFICE.

STEPHEN EVANS ALLEY, OF LONDON, ENGLAND.

STEAM-DRIVEN ROAD VEHICLE.

Application filed March 10, 1924. Serial No. 698,309.

*To all whom it may concern:*

Be it known that I, STEPHEN EVANS ALLEY, a subject of the King of England, residing at London, England, have invented certain new and useful Improvements in Steam-Driven Road Vehicles, of which the following is a specification.

This invention is for improvements in or relating to steam-driven road vehicles and has for one of its objects to provide a compact and efficient arrangement of the parts of the vehicle which shall be advantageous from the point of view of the person operating the vehicle.

According to the primary feature of this invention there is provided a steam-driven road-vehicle wherein the engine is located wholly or mainly below the chassis-frame, and is arranged to transmit motion to the driving road wheels, for example the rear road wheels, from a crank-shaft whereof the crank-pin circle is wholly or mainly below the chassis, which crank-shaft does not constitute the axle of the driving road wheels, and wherein the engine-cylinders and crank-shaft are displaced backward out of the space under the chassis between the front and rear road wheels of the vehicle, to leave said space clear for accommodating the lower end of a vertical boiler carried on the chassis and thereby afford ready access to said lower end of the boiler.

According to another feature of the invention a vehicle as described in the preceding paragraph, wherein the driving road wheels are carried upon a non-rotary axle and are separately differentially driven, is characterized by the fact that the differential drive of the road wheels is provided in the engine crank-shaft which constitutes a combined differential gear and crank-shaft.

For a more complete understanding of the invention, there will now be described, by way of example only and with reference to the accompanying drawings, one constructional form of vehicle according to the invention.

In these drawings:—

Figure 1 is a side elevation of the vehicle, and

Figure 2 is a plan thereof.

Like reference numerals indicate like parts throughout the drawings.

In the construction illustrated, the vehicle chassis-frame is shown at 10, the front road wheels, which are turned for steering, at 11, and the rear road wheels, which are the driving wheels, at 12. It will be seen that the wheels 12 are situated well forward of the rear end 13 of the chassis-frame. Below the chassis-frame are mounted the engine-cylinders 14 and a casing 15 in which is housed the engine crank-shaft. The engine-cylinders 14 are situated over the axle 16 of the wheels 12, while the casing 15 and its contained crank-shaft are situated behind the axle 16 and very near the rear end 13 of the chassis. It will thus be seen that the engine is kept quite clear of the space between the wheels 11 and 12 and consequently this is available for the vertical boiler 17 and the lower end of the latter will be readily accessible.

The axle 16 may be cranked towards its middle if desired in order to permit the centre of gravity of the vehicle to be as low as possible and it is a non-rotary axle, the wheels 12 rotating upon it. These wheels are individually driven through sprockets 18 and 19 and chains 20. The sprockets 19 may conveniently be at the ends of a combined crank-shaft and differential gear, or if desired at the ends of a differential counter-shaft which is in turn geared to the engine crank-shaft, the numeral 23 indicating a suitable situation for whichever of these parts is employed. The front axle is attached to the chassis by a transverse spring 21 and may swivel at its midpoint to provide a three-point suspension which is advantageous when uneven ground is to be traversed. A water tank is shown at 22, a bunker at 24 which has a loose bottom to afford access to the engine, the driver's seat at 25 and a canopy at 26. Suitable lockers 27 and 28 or other appliances may be provided at the ends of the chassis 10. The rear wheels are sprung at 29.

It is to be understood that the invention is not limited to the precise constructional details hereinbefore set forth.

I claim:—

1. A steam-driven road vehicle comprising a chassis-frame and front and rear road wheels, an engine located mainly below the chassis-frame and including cylinders and a crank-shaft which is not a road wheel axle, but whereof the crank-pin circle is mainly below the chassis-frame, a driving connection from the engine crank-shaft to the driving road wheels of the vehicle, and a vertical boiler supplying steam to said engine and carried on the chassis-frame, the engine cylinders and crank-shaft being displaced backward out of the space under the chassis-frame between the front and rear road wheels of the vehicle to leave said space clear for accommodating the lower end of said boiler and afford ready access to such lower end of the boiler.

2. A steam-driven road vehicle comprising a chassis-frame and front and rear road wheels, an engine located wholly below the chassis-frame and including cylinders and a crank-shaft which is not a road wheel axle, but whereof the crank-pin circle is mainly below the chassis-frame, a driving connection from the engine crank-shaft to the rear road wheels, and a vertical boiler supplying steam to said engine and carried on the chassis-frame, the engine crank-shaft being located under the chassis-frame at the rear of the rear road wheels of the vehicle and the engine cylinders being also displaced backward out of the space under the chassis-frame between the front and rear road wheels of the vehicle to leave said space clear for accommodating the lower end of said boiler and afford ready access to such lower end of the boiler.

3. A steam-driven road vehicle comprising a chassis-frame and front and rear road-wheels one set of which are the driving road wheels, an engine located mainly below the chassis-frame and including cylinders and a crank-shaft which is not a road-wheel axle, but constitutes a combined differential gear and crank-shaft and has its crank-pin circle mainly below the chassis-frame, a non-rotary axle on which the driving road wheels are carried a separate driving connection for each driving road wheel from the differential gear in the crank-shaft, and a vertical boiler supplying steam to said engine and carried on the chassis-frame, the engine cylinders and crank-shaft being displaced backward out of the space under the chassis-frame between the front and rear road wheels of the vehicle to leave said space clear for accommodating the lower end of said boiler and afford ready access to such lower end of the boiler.

4. A four-wheel steam-driven road vehicle, comprising in combination, a chassis-frame, a front axle arranged at the front end of said frame, wheels on said axle, an engine located below the chassis-frame and including cylinders and crankshaft mechanism constituting a combined differential gear and crankshaft that has its crank-pin circle below the chassis-frame, a non-rotary rear axle supported by the chassis-frame towards the rear end thereof between said front axle and said crankshaft, driving wheels on said rear axle, separate driving connections, one for each driving wheel, connecting the same with said differential gear, said engine cylinders being displaced backwards out of the space under the chassis-frame between the front and rear road wheels, and a vertical boiler supported by the chassis-frame with its lower end accommodated in said space whereby ready access is afforded to the lower end of the boiler.

In testimony whereof I affix my signature.

STEPHEN EVANS ALLEY.